(12) United States Patent
Lyubomirsky

(10) Patent No.: US 8,577,224 B2
(45) Date of Patent: Nov. 5, 2013

(54) OPTICAL SHAPING FOR AMPLIFICATION IN A SEMICONDUCTOR OPTICAL AMPLIFIER

(75) Inventor: Ilya Lyubomirsky, Temecula, CA (US)

(73) Assignee: Infinera Corporation, Sunnyvale, CA (US)

( * ) Notice: Subject to any disclaimer, the term of this patent is extended or adjusted under 35 U.S.C. 154(b) by 930 days.

(21) Appl. No.: 12/053,457

(22) Filed: Mar. 21, 2008

(65) Prior Publication Data

US 2009/0238568 A1    Sep. 24, 2009

(51) Int. Cl.
*H04B 10/04* (2006.01)

(52) U.S. Cl.
USPC ............................ 398/194; 398/183; 398/198

(58) Field of Classification Search
USPC ........................ 398/182–183, 185–191, 201
See application file for complete search history.

(56) References Cited

U.S. PATENT DOCUMENTS

| | | | |
|---|---|---|---|
| 5,543,952 A | 8/1996 | Yonenaga et al. | |
| 5,867,534 A | 2/1999 | Price et al. | |
| 5,917,642 A | 6/1999 | O'Donnell et al. | |
| 5,999,297 A | 12/1999 | Penninckx | |
| 6,097,525 A | 8/2000 | Ono et al. | |
| 6,337,756 B1 | 1/2002 | Djupsjöbacka | |
| 6,388,786 B1 | 5/2002 | Ono et al. | |
| 6,421,155 B1 | 7/2002 | Yano | |
| 6,424,444 B1 | 7/2002 | Kahn et al. | |
| 6,445,476 B1 | 9/2002 | Kahn et al. | |
| 6,490,069 B1 | 12/2002 | Kahn et al. | |
| 6,522,438 B1 | 2/2003 | Mizuhara | |
| 6,592,274 B2 | 7/2003 | Kahn et al. | |
| 6,595,707 B1 | 7/2003 | Kuwata | |
| 6,795,594 B2 | 9/2004 | Betty | |
| 6,804,472 B1 | 10/2004 | Ho | |
| 6,842,125 B2 | 1/2005 | Mauro et al. | |
| 6,915,082 B2 | 7/2005 | Yano | |
| 7,024,123 B2 | 4/2006 | Yano | |
| 7,049,902 B2 | 5/2006 | Myong et al. | |
| 7,340,182 B2 * | 3/2008 | Uemura et al. | 398/183 |
| 2005/0047797 A1* | 3/2005 | Lee et al. | 398/183 |
| 2005/0058461 A1* | 3/2005 | Lee et al. | 398/198 |
| 2005/0135816 A1* | 6/2005 | Han et al. | 398/188 |
| 2006/0045539 A1* | 3/2006 | Jennen | 398/161 |
| 2006/0204162 A1* | 9/2006 | Stook et al. | 385/3 |
| 2008/0175594 A1* | 7/2008 | Bai et al. | 398/140 |
| 2009/0092396 A1* | 4/2009 | Lyubomirsky | 398/89 |

FOREIGN PATENT DOCUMENTS

| | | |
|---|---|---|
| EP | 0705504 B1 | 9/2001 |
| EP | 0825733 B1 | 1/2003 |
| EP | 0701338 B1 | 7/2003 |
| EP | 1408632 B1 | 8/2005 |
| EP | 1004174 B1 | 9/2005 |
| EP | 1487137 | 5/2006 |

* cited by examiner

*Primary Examiner* — Dzung Tran
(74) *Attorney, Agent, or Firm* — Ross M. Carothers; David L. Soltz

(57) ABSTRACT

The present invention provides a system, apparatus, and method for efficient optical amplification and transmission of a data-encoded optical signal within a networking device, such as a transmitter or receiver. In various embodiments of the invention, an optical duobinary signal or hybrid duobinary signal is generated and shaped in preparation for amplification of the optical signal by an SOA. The deleterious impact of SOA fast gain dynamics may be reduced by taking advantage of characteristics of a duobinary or hybrid duobinary signal (e.g., a relatively lower pulse amplitude and no phase encoded data) and shaping the optical duobinary pulse (e.g., smoothing amplitude swings within the signal and spectral compression).

6 Claims, 7 Drawing Sheets

OPTICAL SHAPING FOR AMPLIFICATION IN A SEMICONDUCTOR OPTICAL AMPLIFIER

BACKGROUND

A. Technical Field

The present invention relates generally to optical communication network systems, and more particularly, to optical duobinary transmitters and receivers configured for fiber-optic communication systems.

B. Background of the Invention

The importance of high-speed optical networks is understood by one of skill in the art. High-speed networking devices typically operate at the core of a network and allow a network provider to transport large amounts of data. In order to meet the widely differing bandwidth demands of various communication applications, several communication technologies are being used, many having unique characteristics and advantages.

Wavelength Division Multiplexed (hereinafter, "WDM") transport networks allow multiple, information-bearing wavelengths to be communicated within a single fiber. The multiplexing of optical wavelengths within a single WDM signal allows a service provider to vary the amount of bandwidth within the WDM network system by changing the number of wavelengths that are active within the system without having to drastically modify the physical infrastructure within the network.

Recent developments in photonic integration have significantly reduced the cost per end-to-end transported information bit within WDM network systems. For example, recent advances in InP photonic integrated circuit technology have enabled multi-channel WDM transmitters or receivers to be integrated on a single InP chip, reducing cost, as well as size, weight and power of optical line cards.

Advanced modulation formats are able to increase the spectral efficiency of high capacity optical networks. The choice of a particular modulation and/or detection technique depends on various engineering tradeoffs, such as tolerance to amplified spontaneous emission noise, nonlinear fiber propagation characteristics, and resilience to narrowband optical filtering due to multiple passes through optical add-drop multiplexers.

As data rates in optical communication systems have traditionally been limited by the speed of available optoelectronic components, it may be important to consider practical aspects of modulation and detection hardware when designing optical modulation formats. Finding a cost effective modulation technique for a particular system application involves aspects of modulation format and modulator technology. Three basic modulator technologies are widely in use today: directly modulated lasers, electroabsorption modulators, and Mach-Zehnder modulators.

Within the class of modulation formats with more than two symbols in the symbol alphabet, correlative coding and pseudo-multilevel modulation have received great interest in optical communications. Pseudo-multileveled data modulation formats use more than two symbols to represent a single bit and the assignment of redundant symbols to transmitted bits is data-independent. Correlative coding refers to the assignment of symbols within a signal being dependant on the transmitted data information.

Optical duobinary belongs to the general class of correlative coding formats. Correlative coding formats employ the signaling set $\{0, \pm|E|\}$ to take advantage of the power-detecting property of direct detection optical receivers, which automatically convert the three optical symbols to the two electrical symbols $(0, |E|^2)$.

The duobinary signal is the fundamental correlative coding in partial response signaling. The signal is produced in the electrical domain by adding polar binary data delayed by 1 bit period to the present data. Thus, the two level polar binary data with symbols $(1,-1)$ is converted into a three level DB signal with symbols $(-2, 0, +2)$. The resulting duobinary signal exhibits a compressed spectrum compared with binary signal.

To perform optical phase modulation, a straight-line modulator or a Mach-Zehnder modulator may be used. In using a Mach-Zehnder modulator that is symmetrically driven around zero transmission, the modulator modulates along the real axis through the origin of the complex optical field pane, which produces exact $\pi$ phase jumps at the expense of residual optical intensity dips at the location of phase transitions.

An important characteristic of an optical transmitter is the amount of optical power that it transmits. Semiconductor optical amplifiers (hereinafter, "SOAs") are one example of an amplifier that may apply a gain to a modulated optical signal to increase the output power of an optical transmitter. However, the SOAs fast gain dynamics, which leads to waveform distortion and cross-gain modulation, poses serious challenges to employing SOAs in high-capacity WDM networks.

Many novel modulation schemes have been considered to improve the performance of SOAs. Recently, significant reduction of cross-gain modulation in the SOA was successfully demonstrated for WDM transmission with return-to-zero differential phase-shift keying (hereinafter, "RZ-DPSK"). Although saturated SOAs perform well for RZ-DPSK transmitters as power boosters and limiting amplifiers, they may not be suitable as in-line amplifiers because the input optical signals to these amplifiers usually have much lower optical signal-to-noise ratio than the signals at the transmitters.

When the SOA is highly saturated, the intensity noise at the input of the SOA can be transferred to phase noise at the output. Additionally, amplified spontaneous noise generated by the SOA may be converted into phase noise on an optical signal. If data is encoded within the phase of the optical signal (e.g., a DPSK signal), this phase noise may further degrade the optical signal being transmitted from the optical transceiver. Accordingly, the physical characteristics and noise caused by the SOA may limit its ability to efficiently operate in certain high-density WDM network environments.

SUMMARY OF THE INVENTION

The present invention provides a system, apparatus, and method for efficient optical amplification and transmission of a data-encoded optical signal within a networking device, such as a transmitter or receiver. In various embodiments of the invention, an optical duobinary signal or hybrid duobinary signal is generated and shaped in preparation for amplification of the optical signal by an SOA. The deleterious impact of SOA fast gain dynamics may be reduced by taking advantage of characteristics of a duobinary or hybrid duobinary signal (e.g., a relatively lower pulse amplitude and no phase encoded data) and shaping the optical duobinary pulse (e.g., smoothing amplitude swings within the signal and spectral compression).

In contrast to the prior art, the duobinary correlation in the present invention is produced by a combination of low pass filtering and optical filtering of the optical duobinary signal whereby the combination is jointly coordinated to obtain a preferred duobinary pulse shape for transmission through an SOA(s). Unlike conventional on-off keying signals, the duobinary pulse spreads out across 2-bit slots due to the duobinary correlation between adjacent bits produced by the duobinary modulator and/or optical pulse shaping filter. Consequently, the peak power of a duobinary pulse is reduced compared with an on-off keying pulse of the same average power. The deleterious pattern effects in an SOA can be reduced compared to on-off keying, and thus more power may be extracted from an SOA with duobinary modulation by operating the SOA in saturation.

Furthermore, unlike the DPSK signal, information is not encoded in the phase of a duobinary signal. Amplified spontaneous emission conversion occurring in SOAs, which is particularly detrimental to DPSK systems, would have a much smaller impact on systems based on duobinary. Thus, the duobinary system would benefit from SOAs used in both transmitters and receivers, resulting in a more economical and efficient optical communication system.

An electrical duobinary coder comprises a pre-coder or differential encoder and duobinary generating filter, which may be implemented in various forms. In various configurations of this invention, the duobinary generating filter function may be divided between the electrical and optical domains, utilizing a combination of electrical low-pass filters operating on the RF drive signal to the Mach-Zehnder modulator, and an optical band-pass filter or filters, placed after the modulator or along the transmission line and operating on the optical signal.

In various embodiments of the present invention, a hybrid duobinary signal is generated from duobinary pre-coding and filtering within the electrical domain and optical conversion by a Mach-Zehnder modulator. This hybrid signal is transmitted to a SOA which amplifies the optical signal strength as it propagates along the transmission line to a narrow optical bandpass filter. The optical bandpass filter completes the duobinary filtering and outputs a spectrally compressed duobinary signal for WDM multiplexing. One skilled in the art will recognize that the optical bandpass filter(s) can be placed in various locations within the optical transmitting or receiving device.

In yet other embodiments of the present invention, a duobinary WDM receiver with a SOA pre-amplifier is provided. A multiplexed signal propagates along the optical transmission line and is received by an SOA pre-amplifier that amplifies the optical signal and transmits the optical signal along the transmission line. An optical demultiplexer receives the optical signal and demultiplexes the signal into individual carrier wavelengths that can be received by a plurality of duobinary receivers.

The receivers demodulate the optical duobinary wavelengths into output binary data. For a particular carrier wavelength, an optical bandpass filter receives and filters the individual wavelength for matched filtering. In this example, the transmitter low-pass filter, optical bandpass filter, and receiver optical bandpass filter are jointly optimized to obtain a preferred duobinary pulse shape for transmission through SOAs and fiber optic transmission lines.

Other objects, features and advantages of the invention will be apparent from the drawings and from the detailed description that follow below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. ("FIG.") 1A is a block diagram of an apparatus that generates an amplified optical duobinary signal according to various embodiments of the invention.

DETAILED DESCRIPTION OF THE PREFERRED EMBODIMENTS

The following description is set forth for purpose of explanation in order to provide an understanding of the invention. However, it is apparent that one skilled in the art will recognize that embodiments of the present invention, some of which are described below, may be incorporated into a number of different computing systems and devices. The embodiments of the present invention may be present in hardware, software or firmware. Structures and devices shown below in block diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

As previously discussed, SOAs operating in the saturation regime perform poorly with conventional on-off keyed signals, resulting in severe waveform distortions or pattern effects due to the fast gain dynamics of the SOA. Additionally, SOAs may generate significant phase noise during the amplification of an optical signal. According to the present invention, a saturated SOA can be used to provide efficient optical power amplification of an amplitude-encoded signal by employing a novel system of electrical and optical duobinary generating filters.

The amplification through an SOA is improved by generating a duobinary or hybrid-duobinary signal prior to transmission into the SOA. A hybrid-duobinary signal is defined as an optical signal that has been encoded within the electrical domain as a duobinary signal but not having been shaped in the optical domain, such as being spectrally compressed by an optical bandpass filter. For example, a hybrid-duobinary signal may be produced by a duobinary filter with a wider bandwidth than typically used for conventional duobinary generation. This exemplary hybrid-duobinary signal has a wider spectrum compared with a conventional duobinary signal but a narrower spectrum when compared with a DPSK signal. The hybrid-duobinary signal may be converted to a pure duobinary signal by processing with an optical bandpass filter.

Figure 1A:
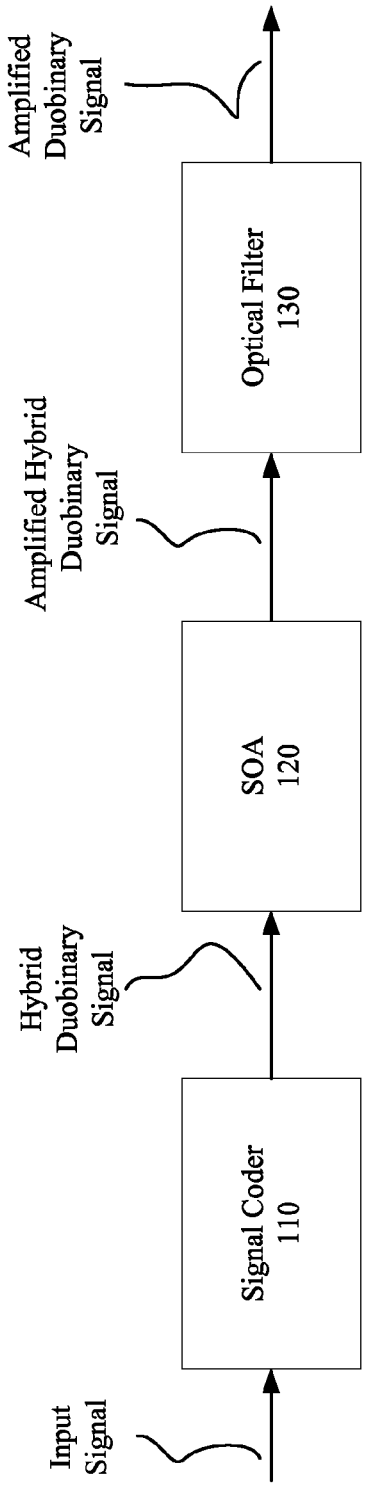
FIG. 1B is block diagram of another apparatus that generates an amplified optical duobinary signal according to various embodiments of the invention.

FIG. 1A is a block diagram of a signal path according to various embodiments of the invention. An input signal is received at a signal coder 110 that converts the input signal to an optical hybrid duobinary signal. The signal coder 110 comprises a pre-coder or differential encoder and a duobinary generating filter, both of which operate within the electrical domain. The signal coder 110 also comprises a Mach-Zehnder modulator that generates the optical hybrid duobinary signal from binary data that had been pre-coded and filtered by the duobinary generating filter. The hybrid duobinary signal has a preferred shaped for amplification through the SOA 120 compared with an on-off keyed signal.

After the hybrid duobinary signal is amplified, it is provided to an optical bandpass filter 130 that effectively converts hybrid duobinary signal to a duobinary signal. This conversion is performed by spectrally compressing the signal through removing frequency components within the hybrid signal that fall outside of the bandpass frequency range of the optical filter 130.

Figure 1B:
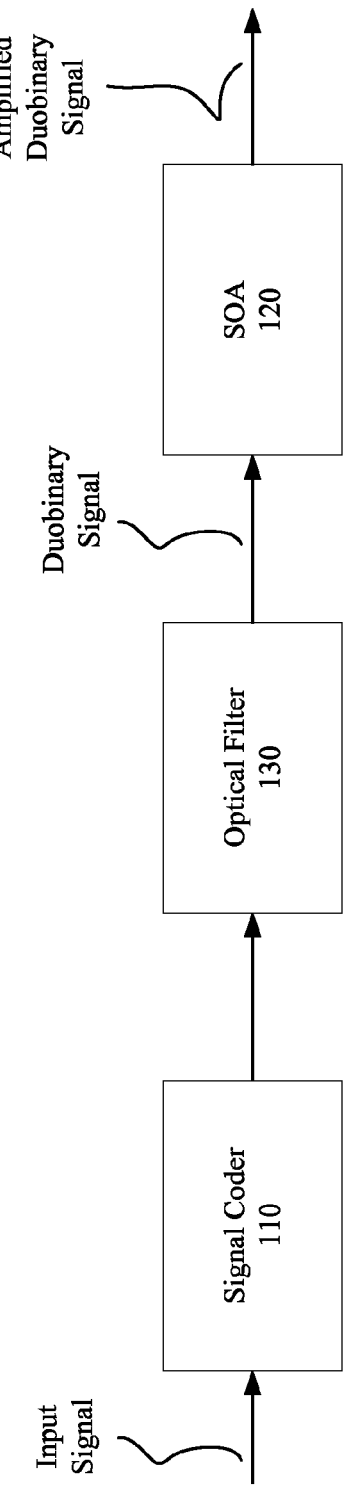

FIG. 1B illustrates another signal path according to various embodiments of the invention. In this particular instance, an optical duobinary signal is created using the signal coder 110 and the optical filter 130. The duobinary signal is then amplified by the SOA 120. This particular instance may be particularly relevant in systems that employ phase-based encoding so that the phase-encoded signals are converted to duobinary (or hybrid duobinary) signals for amplification purposes.

Figure 2:
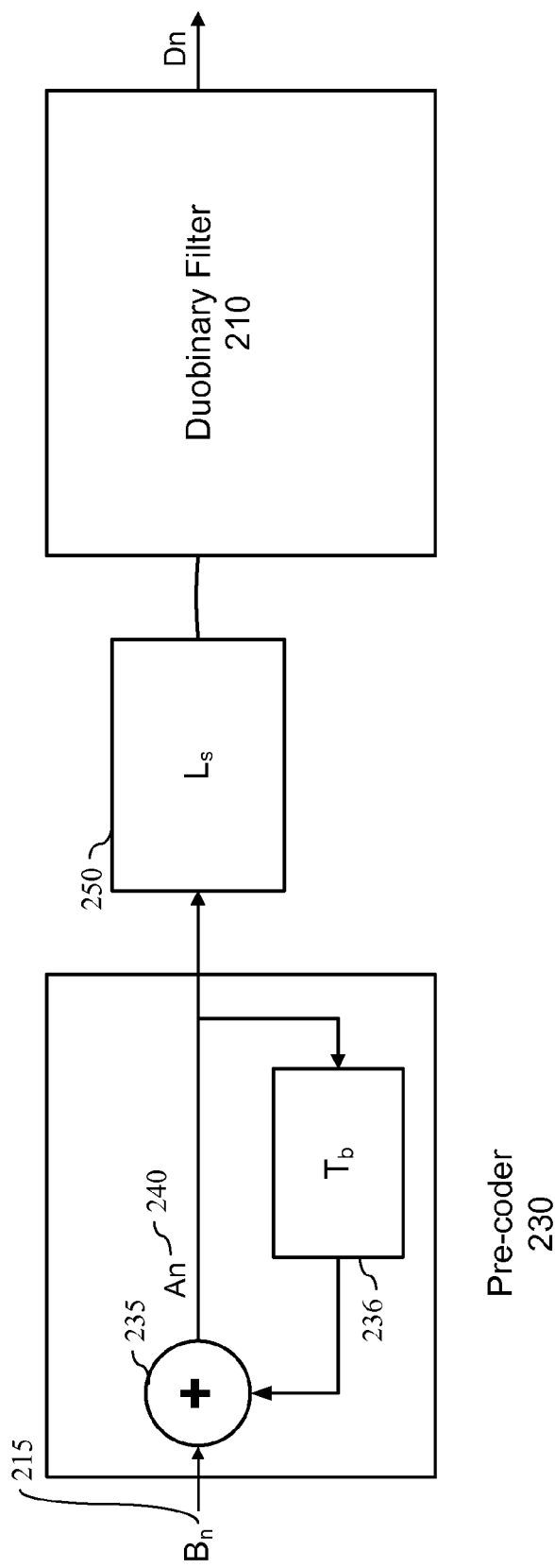
FIG. 2 is an illustration of a pre-coder and duobinary filter according to various embodiments of the invention.

FIG. 2 illustrates a coder according to various embodiments of the invention. The signal coder or electrical duobinary coder has two major elements as shown in FIG. 2: (1) a pre-coder 230 or differential encoder and (2) duobinary generating filter 210.

The pre-coder 230 receives a stream of bits ($B_n$) 215 and inserts error correction information therein to generate an encoded stream of bits ($A_n$) 240. In this example, a feedback loop comprising a bit delay 236 is used to insert copied bits, having a particular delay, into the stream of bits 215 to generate the encoded stream of bits 240. In various embodiments an adding module 235, such as an XOR gate, may be used that effectively inserts a copy of a previous bit within the bit stream. One skilled in the art will recognize that various bit delays may be used to encode the signal.

A level shifter 250 receives the encoded stream of bits 240 and generates a polarized signal. In certain embodiments, this level shifter 250 effectively functions as a DC block that removes a DC bias within the encoded stream of bits 240.

The duobinary filter 210 may be implemented in various forms including a conventional duobinary filter in which a delay-and-add filter with a bit period delay is used and followed by a "brick-wall" low-pass filter to filter out unnecessary frequency components at frequencies larger than half of the bitrate of the signal. Alternatively, a single Gaussian or Bessel shaped low-pass filter can be used.

Figure 3:
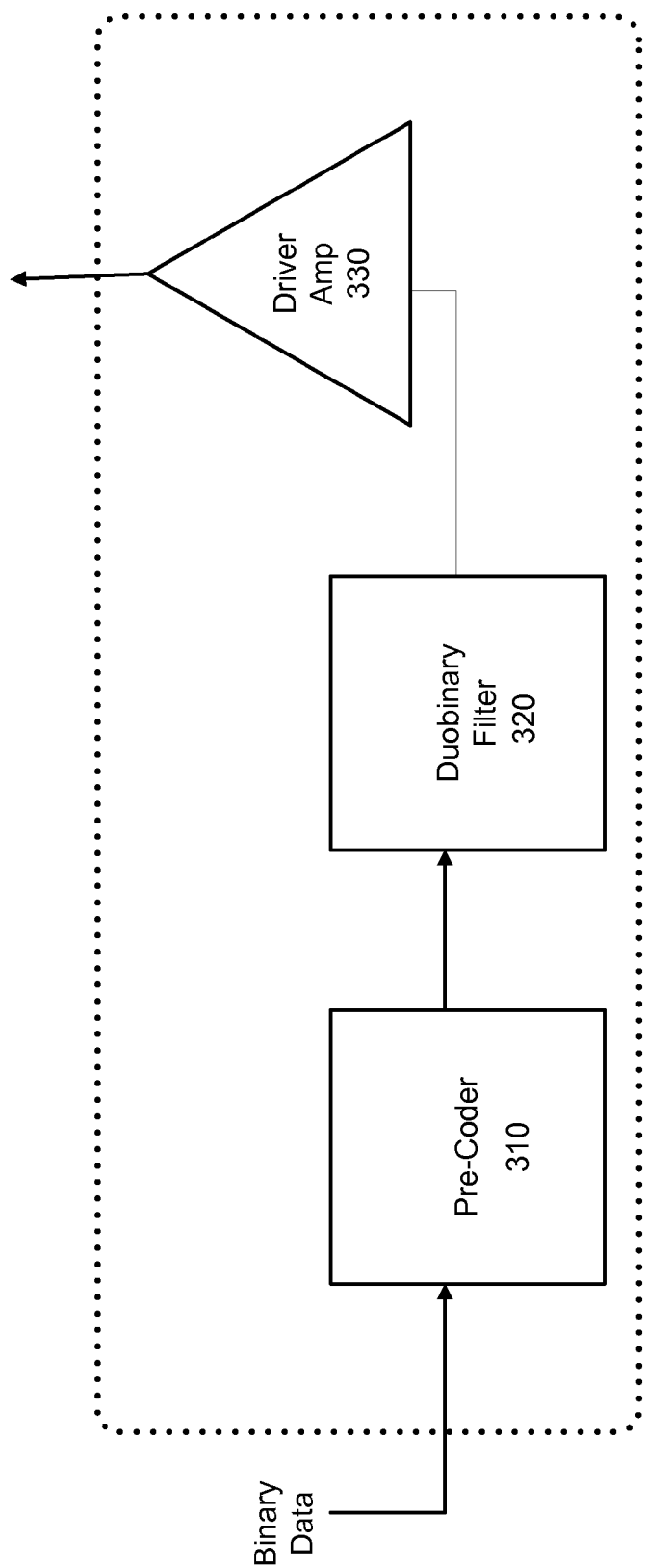
FIG. 3 is an illustration of a signal path that generates an electrical driver signal according to various embodiments of the invention.

FIG. 3 illustrates a signal path that generates an electrical driver signal according to various embodiments of the invention. As shown, binary data is fed into a pre-coder 310 that pre-codes the data. The pre-coded data is provided to a duobinary filter 320 that generates an electrical driver signal that is used to drive a Mach-Zehnder modulator. In certain embodiments, the duobinary filter 320 is a delay-and-add filter followed by a "brick wall" low-pass filter, as previously described.

The electrical driver signal is amplified by a driver amplifier 330 so that the power on the signal is within a preferred range. The amplified electrical driver signal is provided to the Mach-Zehnder modulator that generates an optical hybrid duobinary signal. This optical hybrid duobinary signal may be amplified by an SOA or converted to a traditional optical duobinary signal by an optical bandpass filter that optically compresses the signal spectrum, and subsequently amplified by the SOA. One skilled in the art will recognize that the electrical driver signal may be integrated within various components in an optical network including an optical transmitter, an optical receiver and intermediary components such as optical add/drop multiplexers.

Figure 4:
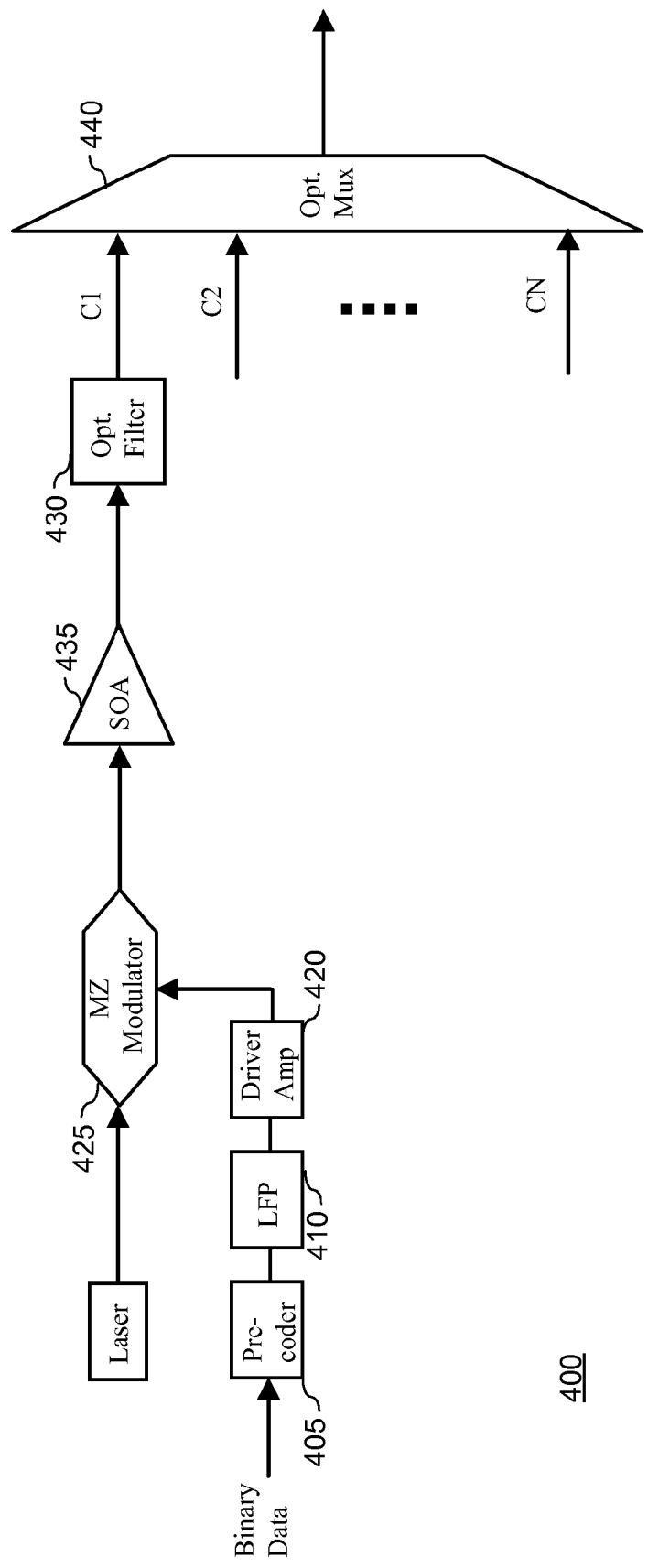
FIG. 4 is an illustration of a WDM transmitter according to various embodiments of the invention.

FIG. 4 illustrates a WDM transmitter according to various embodiments of the invention. As shown, the duobinary generating filter functions are divided between an electrical low-pass filter 410 and an optical bandpass filter 430. An SOA may be positioned within the signal path such that either an optical hybrid-duobinary signal or an optical duobinary signal is amplified by the SOA.

Binary data is received at a pre-coder 405 and the pre-coded data is sent to a low-pass filter 410. In various embodiments of the invention, the low-pass filter 410 bandwidth is typically greater than thirty percent of the signal bitrate and may approach the signal bitrate depending on the optical line. The low-pass filter 410 is coupled to a driver amplifier 420 that amplifies the filtered signal.

In certain embodiments, the signal is amplified to a peak-to-peak amplitude of $2V\pi$ and applied to a Mach-Zehnder modulator 425 biased at a null. The Mach-Zehnder modulator 425 outputs an optical signal that is a hybrid between duobinary signal and DPSK signal. This signal is transmitted to a SOA 435 that applies a gain to the hybrid signal. The pulse shape of the hybrid signal allows for more efficient amplification when compared to an on-off keyed signal pulse and a pure DPSK signal. As previously discussed, the hybrid pulse shape has relatively lower peak-to-peak amplitudes than an on-off keyed pulse and is not phase-encoded like a DPSK signal.

The SOA 435 amplifies the optical signal strength as it propagates along the transmission line to a narrow optical bandpass filter 430. The optical bandpass filter 430 completes the duobinary filtering and outputs a spectrally compressed duobinary signal for WDM multiplexing. One skilled in the art will recognize that the optical bandpass filter 430 can be placed in various locations throughout the network, including but not limited to, integrated within an optical multiplexer 440 or optical demultiplexer. The optical filtering function can also be split among several bandpass filters placed at various locations along the transmission line.

In various other embodiments of the invention, the frequency response of Mach-Zehnder modulator 425 may be designed to mimic the function of the low-pass filter 410. In yet another variation, the low-pass filter is removed so that the output of Mach-Zehnder modulator is a pure DPSK signal. In this case, the optical bandwidth of the bandpass filter is positioned prior to the SOA 435 and adjusted appropriately to perform DPSK to duobinary conversion completely in optical domain.

In certain embodiments of the invention, the optical filter 430, in combination with the low-pass filter 410, are jointly optimized to obtain a preferred duobinary pulse shape for transmission through the SOA 435 or SOAs. The optical duobinary signal is received by an optical multiplexer 440 that multiplexes the signals for propagation along an optical transmission line.

Although FIG. 4 illustrates the application of an optical duobinary transmitter, it is to be understood that a plurality of optical duobinary transmitters may be used and, although not shown, as programmably adaptable or dynamically adaptable optical transmitters. In particular, the low-pass filter bandwidth is adapted, whether in a single-drive or dual-drive Mach-Zehnder modulator configuration, with any combinations of amplifiers and can also be used in a similar photonic integrated circuit configuration.

Figure 5:
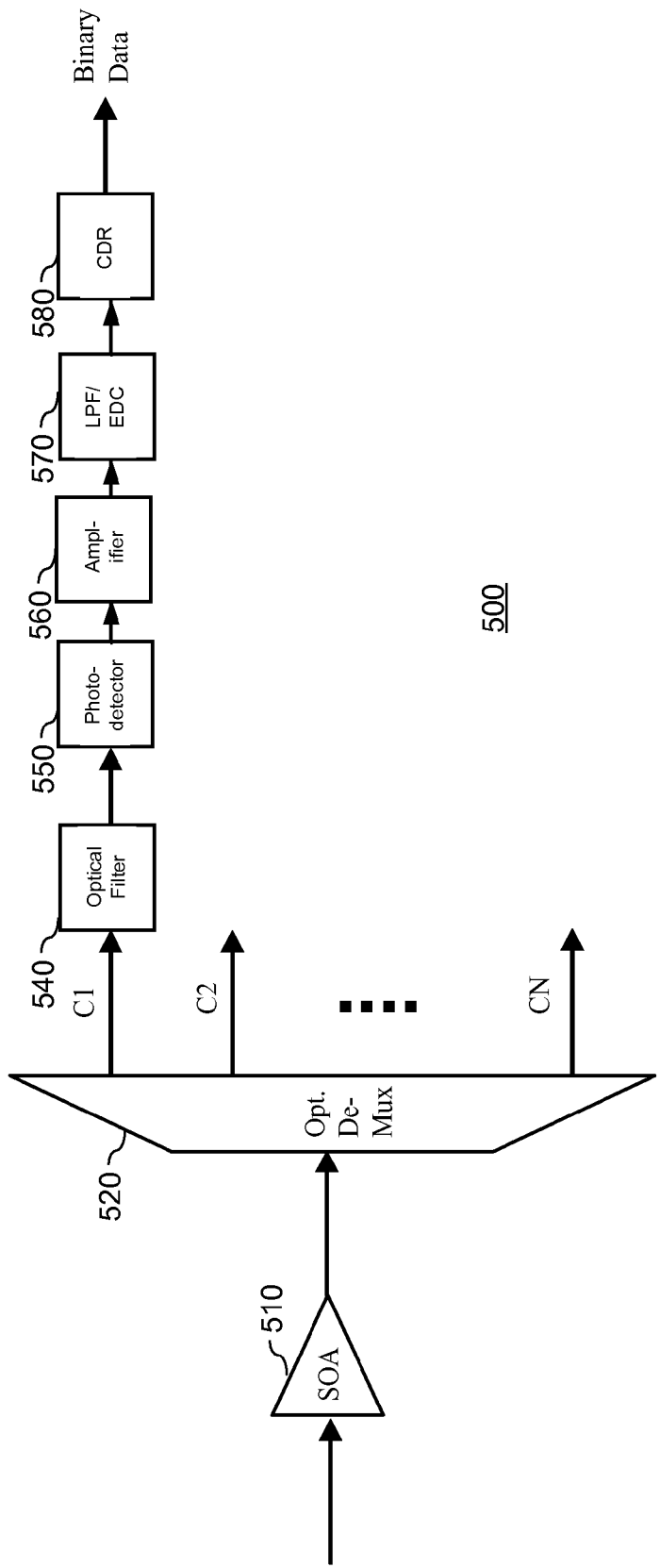
FIG. 5 is an illustration of a WDM receiver according to various embodiments of the invention.

FIG. 5 illustrates a duobinary WDM receiver 500 with a SOA pre-amplifier 500 according to various embodiments of the invention. The receiver 500 comprises a SOA 510 that pre-amplifies a WDM signal prior to being demultiplexed by demultiplexer 520. The SOA 510 allows the signal to have less distortion and a longer pulse reach compared to prior teachings. The optical demultiplexer 520, coupled to the SOA 510, receives the optical signal and demultiplexes the signal into individual carrier wavelengths 530 that can be received by a plurality of duobinary receivers.

Each duobinary WDM receiver comprises an optical filter 540, a photodetector 550, an amplifier 560, a low-pass filter or optional electronic dispersion compensation (EDC) circuit 570, and a clock data recovery circuit 580. The receiver demodulates the respective optical duobinary signals into an output binary data 590.

For a particular carrier wavelength, the optical filter 540 receives the individual wavelength and provides signal shaping that results in improved matched filtering for duobinary signaling. The photodetector 550, which may be a photodiode such as a PIN diode or avalanche photodiode, converts the optical signal wavelength to a corresponding electrical signal. The electrical signal is amplified by amplifier 560 and higher frequencies are removed by low-pass filter 570. In certain instances, the electronic dispersion compensation circuit 570 may compensate for dispersive effects on the signal as it propagated through the network. Finally, the clock and data recovery circuit 580 recovers/realigns the signal so that pulse shapes and timing are improved resulting in a series of binary data.

In certain embodiments of the invention, the transmitter low-pass filter 410, transmitter optical bandpass filter 430, and receiver optical filter 540 are jointly optimized to obtain the optimum duobinary pulse shape for transmission through SOA 435, SOA 510, and fiber optic transmission line between the transmitter and receiver including intermediary devices therein.

Figure 6:
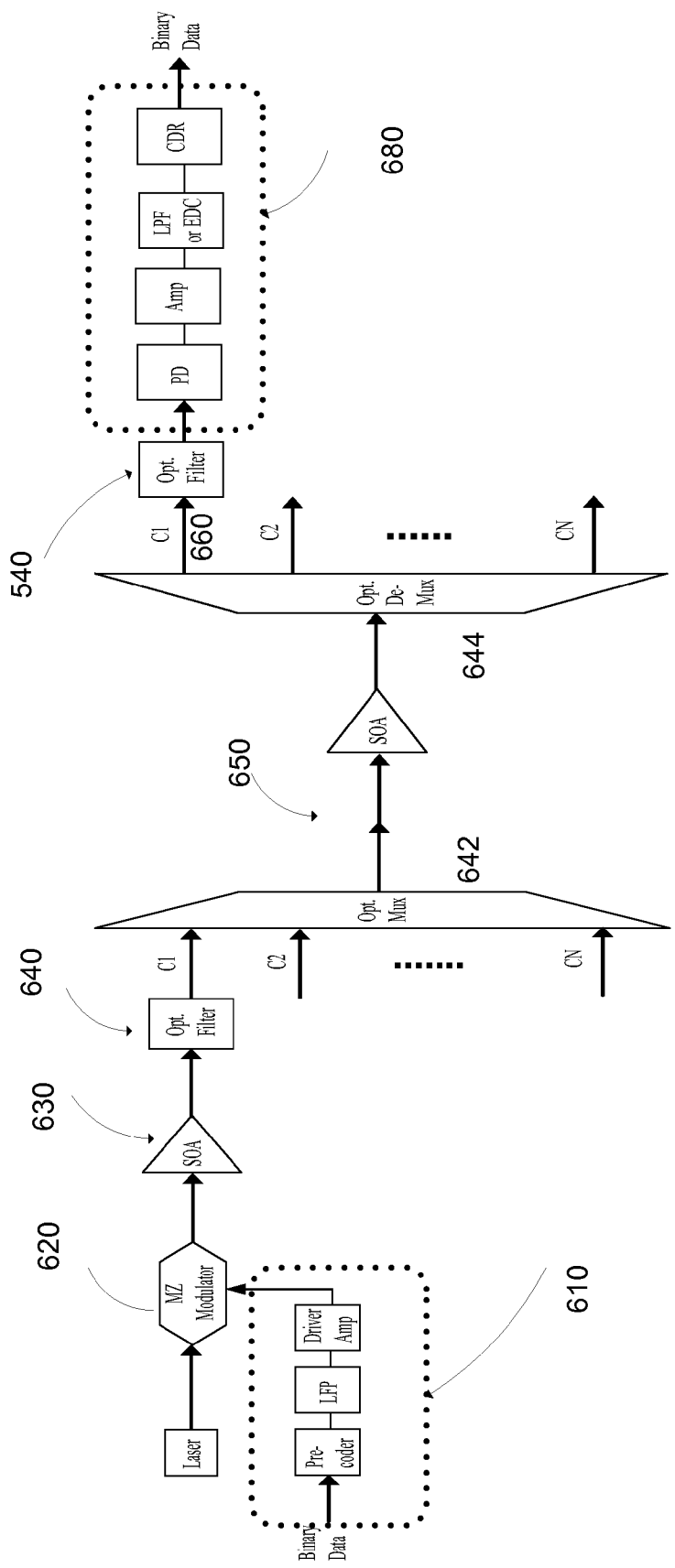
FIG. 6 is an illustration of a system comprising an optical duobinary transmitter, optical duobinary receiver and optical transmission line according to various embodiments of the invention.

FIG. 6 illustrates a WDM network system that communicates data between a transmitter and receiver according to various embodiments of the invention. Binary data is input into an electrical transmitter driver 610 comprising a precoder, an amplifier, and a low-pass filter. The electrical transmitter driver 610 outputs an electrical signal that drives a Mach-Zehnder modulator 620 resulting in an optical hybrid duobinary signal. The pulse shape of the optical hybrid duobinary signal allows for efficient amplification by SOA 630.

The amplified hybrid signal is converted to an optical duobinary signal by an optical bandpass filter 640 that spectrally compresses the signal within the filter's passband. The optical duobinary signal is multiplexed into a WDM signal with other wavelength by an optical multiplexer 642. The WDM signal is then propagated along a network transmission line 650. This transmission line 650 may comprises optical amplifiers such as an SOA(s) (as shown) or erbium-doped fiber amplifiers, Raman amplifiers, or other optical amplification means, dispersion compensating modules, optical signal processing filters, and optical WDM filters.

In certain embodiments of the invention, the optical filter 640 may also provide duobinary pulse shaping for transmission through the fiber-optic transmission line 650, and any SOAs therein.

After traversing the transmission line 650, the WDM signal is demultiplexed into a plurality of separate optical duobinary signal wavelengths by an optical demultiplexer 644. Each of the duobinary signal wavelengths is input into an optical filter 540 that shapes the duobinary signal for processing by a respective receiver 680. In certain embodiments of the invention, the optical filter 540 is configured relative to the low-pass filter and optical filter 640 to provide a preferred pulse shape for amplification and demodulation.

In various embodiments of the invention, the receiver 680 comprises a photodiode, an amplifier, a low-pass filter, an optional electronic dispersion compensation circuit, and a clock data recovery circuit. The receiver 680 demodulates the respective optical duobinary signal wavelength into output binary data.

A number of optical add drop modules (hereinafter, "OADMs") may be present along the optical transmission line. At each OADM, some wavelength channels may be dropped, added, or passed through. Thus, depending on the number of OADMs in the optical transmission line, and the specific traffic pattern, the optical duobinary signals in different wavelength channels may encounter a different number of narrow filters which distort each signal to a different extent.

Therefore, it can be typically expected that signals that traverse through the greatest number of OADMs will have experienced increased deleterious effects due to filtering by multiple narrow optical filters. The optical duobinary transmitters of the present invention allow each transmitter to be adjusted independently to optimize the low-pass filter bandwidth for the optical duobinary signal in that channel depending on the number of OADMs passed through by that channel. Typically, the low-pass filter bandwidth is increased to mitigate the impact of propagation through multiple OADMs.

Figure 7:
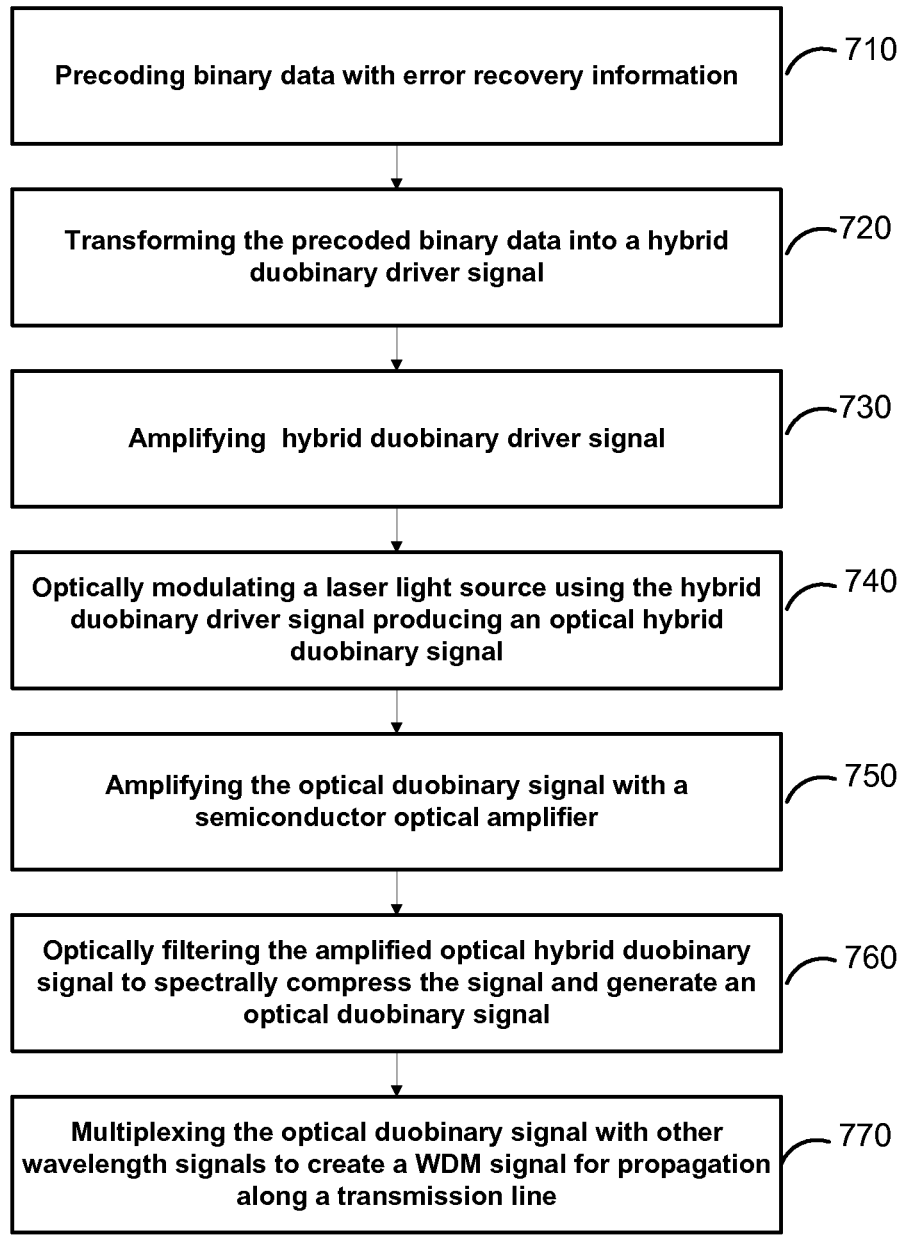
FIG. 7 is an illustration of a method for generating, amplifying and transmitting an optical duobinary signal within a WDM signal according to various embodiments of the invention.

FIG. 7 is a flowchart illustrating a method, independent of structure, for generating a duobinary signal and creating a WDM signal according to various embodiments of the invention. Binary data is precoded 710 with information related to error recovery to compensate for errors generated within the signal as it is constructed and propagated along a transmission line. The precoded data is transformed 720 into an electrical driver signal. In various embodiments, this pre-coding and transformation is performed by a delay-and-add filter with a bit period delay is used and followed by a "brick-wall" low-pass filter to filter out unnecessary frequency components at frequencies larger than half of the bitrate of the signal.

The electrical driver signal is amplified 730 to ensure that the power on the signal falls within a range and subsequently provided to an optical modulator. The optical modulator creates 740 an optical hybrid duobinary signal using the electrical driver signal. In various embodiments of the invention, the optical modulator is a Mach-Zehnder modulator but one skilled in the art will recognize that other optical modulators may be used within the scope of the present invention.

The optical hybrid duobinary signal is amplified 750 using an SOA. The pulse shape of the optical hybrid duobinary signal reduces the distortions/noise generated by the SOA when compared to an on-off keyed signal or a phase-encoded signal. The amplified optical hybrid duobinary signal is optically filtered 760 and spectrally compressed to generate an optical duobinary signal. In various embodiments, an optical bandpass filter is used to create the optical duobinary signal. The characteristics of the optical filter may be matched to another an optical filter in a corresponding WDM receiver. Additionally, the optical filter may shape the duobinary pulse relative to the characteristics of the transmission line on which the WDM signal is to propagate. For example, the optical duobinary pulse may be shaped relative to the number and parameters of SOAs within the transmission line so that a preferred amplification may occur on the optical duobinary signal within the WDM signal.

The optical duobinary signal is multiplexed 770 into a WDM signal. The optical filtering function and optical multiplexing function may be integrated within a single component such as an optical multiplexer. Thereafter, the WDM is transmitted into a piece of optical fiber and propagated to a receiving device within the WDM network.

While the present invention has been described with reference to certain exemplary embodiments, those skilled in the art will recognize that various modifications may be provided. Accordingly, the scope of the invention is to be limited only by the following claims.

What is claimed is:

1. An optical duobinary transmitter apparatus comprising:
    a pre-coder that receives binary data and inserts error correction information within the binary data;
    a duobinary filter that converts the error correction information and binary data to an electrical driver signal;
    a modulator that generates an optical hybrid duobinary signal at least partially in response to the electrical driver signal, the modulator having an output that supplies the optical hybrid duobinary signal;
    a semiconductor optical amplifier, operating in a saturation regime, that amplifies the optical hybrid duobinary signal supplied from the output of the modulator;
    an optical filter that spectrally compresses the optical hybrid duobinary signal and generates an optical duobinary signal; and
    an optical multiplexer coupled to the optical filter and that multiplexes the optical duobinary signal into a WDM signal.

2. The apparatus of claim 1 wherein the optical filter is integrated within the optical multiplexer.

3. The apparatus of claim 1 further comprising a driver amplifier coupled to the duobinary filter and that amplifies the electrical driver signal prior to being received at the modulator.

4. The apparatus of claim 1 wherein the modulator is a Mach-Zehnder modulator.

5. A method of transmitting a plurality of optical duobinary signals within a WDM signal, the method comprising the steps of:
    converting binary data into an electrical driver signal;
    modulating, with a modulator, an optical signal in accordance with the electrical driver signal and generating an optical hybrid duobinary signal;
    outputting the optical hybrid duobinary signal from the modulator;
    amplifying the optical duobinary signal output form the modulator with a semiconductor optical amplifier operating in a saturation regime;
    spectrally compressing the optical hybrid duobinary signal to generate a corresponding optical duobinary signal; and
    multiplexing the optical duobinary signal with at least an additional optical signal to provide a WDM signal.

6. The method of claim 5, further including a step of transmitting the WDM signal on an optical communication path.

* * * * *